(12) United States Patent
Sakamoto et al.

(10) Patent No.: US 11,852,863 B2
(45) Date of Patent: Dec. 26, 2023

(54) MODE MULTIPLEXING/DEMULTIPLEXING OPTICAL CIRCUIT

(71) Applicant: Nippon Telegraph and Telephone Corporation, Tokyo (JP)

(72) Inventors: Junji Sakamoto, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 248 days.

(21) Appl. No.: 17/424,417

(22) PCT Filed: Jan. 17, 2020

(86) PCT No.: PCT/JP2020/001468
§ 371 (c)(1),
(2) Date: Jul. 20, 2021

(87) PCT Pub. No.: WO2020/153250
PCT Pub. Date: Jul. 30, 2020

(65) Prior Publication Data
US 2022/0099888 A1    Mar. 31, 2022

(30) Foreign Application Priority Data
Jan. 23, 2019   (JP) ................................ 2019-009209

(51) Int. Cl.
*G02B 6/14*     (2006.01)
*G02B 6/12*     (2006.01)

(52) U.S. Cl.
CPC ........... *G02B 6/12007* (2013.01); *G02B 6/14* (2013.01); *G02B 2006/12152* (2013.01); *G02B 2006/12164* (2013.01)

(58) Field of Classification Search
None
See application file for complete search history.

(56) References Cited

U.S. PATENT DOCUMENTS

| | | | |
|---|---|---|---|
| 5,946,434 A | 8/1999 | Lee | |
| 6,269,205 B1* | 7/2001 | Peral | .................. G02B 6/29319 385/11 |
| 2013/0223791 A1* | 8/2013 | Okayama | ............... G02B 6/354 385/16 |
| 2017/0205578 A1 | 1/2017 | Luo et al. | |
| 2017/0131472 A1* | 5/2017 | Kobyakov | ............. G02B 6/305 |

FOREIGN PATENT DOCUMENTS

| | | |
|---|---|---|
| JP | H10-73737 A | 3/1998 |
| JP | 2015-152399 A | 8/2015 |
| JP | 2017-504830 A | 2/2017 |

* cited by examiner

*Primary Examiner* — Chad H Smith
(74) *Attorney, Agent, or Firm* — Workman Nydegger

(57) ABSTRACT

A mode multiplexing/demultiplexing optical circuit with a reduced inter-mode crosstalk is provided. A mode multiplexing/demultiplexing optical circuit includes a Port 1 through which light from a light source is input to a waveguide, a Port 3 through which light propagating through a first waveguide is output, a mode conversion unit located adjacent to the first waveguide, and configured to convert a first-order mode light input from the Port 3 to a second-order mode, and Port 2 configured to convert, via a waveguide located adjacent to the mode conversion unit, second-order mode light input to the mode conversion unit to a zeroth-order mode.

3 Claims, 6 Drawing Sheets

| BACKSCATTERED LIGHT MODE | OUTPUT TO Port 1 | OUTPUT TO Port 2 |
|---|---|---|
| ZEROTH-ORDER MODE | ZEROTH-ORDER MODE (SIGNAL COMPONENT) (P1) | ZEROTH-ORDER MODE (NOISE COMPONENT) (P2) |
| LP11a MODE | LP11a MODE (NOISE COMPONENT) | ZEROTH-ORDER MODE (SIGNAL COMPONENT) |
| LP11b MODE | LP11b MODE (NOISE COMPONENT) | ZEROTH-ORDER MODE (NOISE COMPONENT) (P3) |

MODE MULTIPLEXING/DEMULTIPLEXING OPTICAL CIRCUIT

TECHNICAL FIELD

The present disclosure relates to optical devices and, more particularly, to mode multiplexing/demultiplexing optical circuits.

BACKGROUND ART

In recent years, many optical communication systems utilizing the degree of freedom of modes have been proposed. For example, a method of transmitting signals in each mode called spatial multiplexing in order to increase the transmission capacity per fiber, or a method of making higher-order mode test light incident on a fiber to be measured, and monitoring a state of a laid fiber from the intensity of backscattered light (for example, see Patent Literature 1).

With reference to FIG. 1, a method of monitoring a laid fiber utilizing a higher-order mode will be briefly described. Typically, optical communications utilize infrared light in the 1.55 μm band where fiber propagation loss is the smallest. The core diameter of the laid fiber is determined such that single mode propagation is performed in this wavelength. On the other hand, when light in a 1.0 μm band is used to monitor the laid fiber, multi-mode propagation in the zeroth-order mode and the first-order mode is enabled. The first-order mode reacts more sensitively to fiber degradation, such as micro-bends, cracks, and the like than in the zeroth-order mode, so that sensitive sensing is possible.

As illustrated in FIG. 1, continuous light in the 1.0 μm band from a light source 11 is input to a converter 12 configured to include an acoustic optical element and the like, and converted into a pulse signal. The pulse signal from the converter 12 is input to a Port 2 of a mode converter (mode coupler) 14 via an optical circulator 13. The pulse signal input to the Port 2 of the mode coupler 14 is converted from the zeroth-order mode to the first-order mode and output from a Port 3. The pulse signal converted to the first-order mode propagates through a laid fiber 19 connected to the Port 3 of the mode coupler 14.

The backscattered light generated at a degraded location in the laid fiber 19 is again input to the Port 3 of the mode coupler 14. The backscattered light output from the Port 1 and the Port 2 of the mode coupler 14 is photoelectrically converted by photodiodes 15 and 16, respectively. The electrical outputs from the photodiodes 15 and 16 are converted to digital signals by an A/D converter 17. An arithmetic processing device 18 such as a computer estimates a degraded location of the fiber by analyzing the digital signal through the use of an optical time domain reflectometer (OTDR). A mode coupler using a planar light wave circuit is used for mode multiplexing/demultiplexing.

As illustrated in FIG. 2, a mode coupler in the related art is achieved by an asymmetric directional coupler with different waveguide widths using a quartz-based planar lightwave circuit (PLC). In the PLC, an optical waveguide is produced with a core and a cladding having a lower refractive index than the core, on a planar substrate, by patterning by photolithography or the like, and etching, and a plurality of basic optical circuits (for example, a directional coupler, a Mach-Zehnder interferometer, or the like) are combined, so that various functions are achieved. The mode coupler is capable of converting zeroth-order mode light and higher-order mode light at about 100% by matching the propagation constant $\beta$ $(\lambda, W_0, \Delta)_{m=0}$ of the zeroth-order mode light propagating through the thinner waveguide 22 with the propagation constant $\beta$ $(\lambda, W_1, \Delta)_{m=1}$ of the higher-order mode light propagating through the thicker waveguide 21, and appropriately setting the length of the mode coupler. Here, $\lambda$, W, $\Delta$, and m represent the wavelength, the waveguide width, the refractive index difference, and the mode order, respectively.

As illustrated in FIG. 2, most of the zeroth-order mode light propagating through the thicker waveguide 21 of the mode coupler passes through as it is because the propagation constant does not match the propagation constant of the zeroth-order mode light propagating through the thinner waveguide 22 (a solid arrow extending between a Port 1 and a Port 3 in FIG. 2). The first-order mode light propagating through the thicker waveguide 21 of the mode coupler is converted to zeroth-order mode light and coupled to the thinner waveguide 22, or the zeroth-order mode light propagating through the thinner waveguide 22 is converted to the first-order mode light and coupled to the thicker waveguide 21 (a dotted white arrow extending between the Port 1 and the Port 3 in FIG. 2).

CITATION LIST

Patent Literature

Patent Literature 1: JP 2015-152399 A

SUMMARY OF THE INVENTION

Technical Problem

FIG. 3 is a diagram illustrating a state in which light input from the Port 3 is multiplexed and demultiplexed to the Port 1 and the Port 2, in the mode coupler. As described with reference to FIG. 2, most of the zeroth-order mode light propagating through the thicker waveguide 21 of the mode coupler passes through as it is, because the propagation constant does not match the propagation constant of the zeroth-order mode light propagating through the thinner waveguide 22 (a solid arrow from the Port 3 to the Port 1 in FIG. 3).

However, a few percent of the zeroth-order mode light propagating through the thicker waveguide 21 of the mode coupler is converted to first-order mode light and coupled to the thinner waveguide 22 (an arrow in dashed line from the Port 3 to the Port 2 in FIG. 3). Therefore, in the configuration of the mode coupler illustrated in FIG. 1, there is a problem in that the extinction ratio between the zeroth-order mode and the first-order mode components degrades during the demultiplexing.

Similarly, higher-order mode components that are not converted to the zeroth-order mode components are mixed and output to the Port 1 in FIG. 3.

FIG. 4 is a diagram illustrating a distribution of a first-order mode propagating through the fibers. The backscattered light propagating through the laid fiber 19 has three modes: LP11a having two light intensity peaks in the x-direction as in FIG. 4; LP11b having two light intensity peaks in the y-direction; and a zeroth-order mode (not illustrated). Because only LP11a can be demultiplexed by the mode coupler 14 of the PLC, most of LP11b passes through as it is, and a portion of LP11b is converted to a zeroth-order mode and output to the Port 2.

FIG. 5 is a diagram illustrating the relationship between input and output when three modes of backscattered light input from the Port 3 are multiplexed and demultiplexed to the Port 1 and the Port 2 in the mode coupler. This is a diagram summarizing the feature described above.

In FIG. 5, the solid arrows from the Port 3 to the Port 1 indicate most of the backscattered light that is output without being converted from the zeroth-order mode (signal component of the Port 1). A solid white arrow from the Port 3 to the Port 1 indicates most of the backscattered light LP11b output without being converted from the first-order mode (noise component of the Port 1). The solid gray arrow from the Port 3 to the Port 1 indicates a portion of the backscattered light LP11a output without being converted from the first-order mode (noise component of the Port 1).

Further, in FIG. 5, the dotted white arrow from the Port 3 to the Port 2 indicates most of the backscattered light LP11a that is converted to the light of the zeroth-order mode from the first-order mode and output (signal component of the Port 2).

The dashed line arrow P2 from the Port 3 to the Port 2 indicates a portion of the backscattered light that is output without being converted from the zeroth-order mode (noise component of the Port 2). The double-dotted arrow from the Port 3 to the Port 2 indicates a portion of the backscattered light LP11b that is converted from the first-order mode to the zeroth-order mode and is output (noise component of the Port 2).

As described above, because the signal component and the noise component are output to the Port 1 and the Port 2 of the mode coupler, a mode coupler with a high-extinction ratio is required in which the noise component (hereinafter referred to as "inter-mode crosstalk") is suppressed for the desired signal component, in order to perform long distance measurement.

The present disclosure has been made in light of the problem, and an object of the present disclosure is to provide a mode multiplexing/demultiplexing optical circuit with reduced inter-mode crosstalk.

Means for Solving the Problem

To achieve such an object, aspects of the present disclosure are mode multiplexing/demultiplexing optical circuits. A mode multiplexing/demultiplexing optical circuit according to an embodiment including a first waveguide and a second waveguide formed on a planar light wave circuit, the mode multiplexing/demultiplexing optical circuit including: a first input/output port configured to allow light from a light source to be input to the first waveguide; a second input/output port configured to allow light propagating through the first waveguide to be output; a mode conversion unit located adjacent to the first waveguide, and configured to convert a mode of light input from the second input/output port to a mode of a higher order than an order of the mode when the light is input to the second input/output port; and a third output port configured to convert, via the second waveguide located adjacent to the mode conversion unit, a mode of light input to the mode conversion unit to a mode of a lower order than the order of the mode when the light is input to the second input/output port, and output the converted light.

This configuration enables providing a mode multiplexing/demultiplexing optical circuit with a reduced inter-mode crosstalk.

Effects of the Invention

As described above, according to the present disclosure, it is possible to suppress inter-mode crosstalk, which makes it possible to suppress degradation of SN and perform long distance measurement using an OTDR.

DESCRIPTION OF EMBODIMENTS

Hereinafter, an embodiment of the present disclosure will be described in detail with reference to the drawings. The numerical values described in the following description are exemplary, and the present disclosure is not limited to the values.

Figure 5:
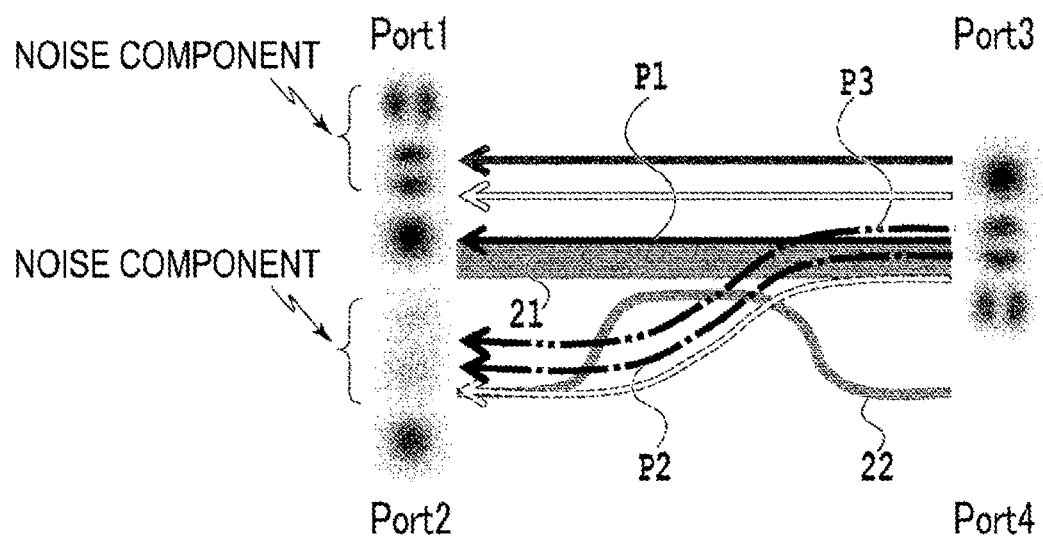
FIG. 5 is a diagram illustrating a relationship between input and output when backscattered light of three modes input from the Port 3 is multiplexed and demultiplexed to the Port 1 and the Port 2, in the mode coupler in the related art of FIG. 2.
Figures 6, 7:
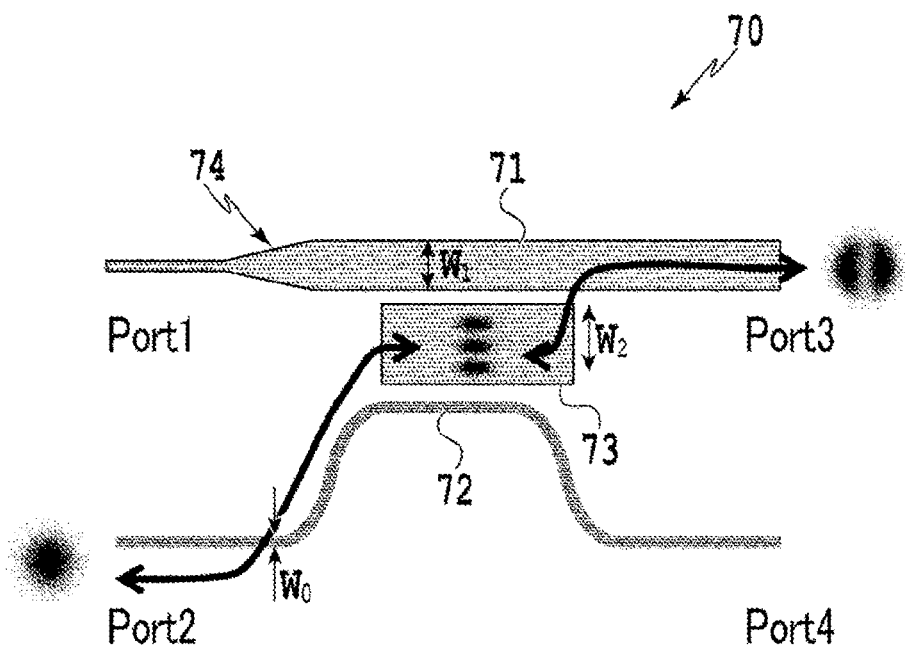
FIG. 6 is a diagram illustrating inter-mode crosstalk, which is a noise component, in an OTDR when the mode coupler having the input/output relationship illustrated in FIG. 5 is used.
FIG. 7 is a diagram illustrating a mode coupler according to an embodiment of the present disclosure.

Prior to a detailed description of embodiments of the present disclosure, inter-mode crosstalk will be defined. FIG. 6 is a diagram illustrating inter-mode crosstalk, which is a noise component, in an OTDR when a mode coupler having an input/output relationship illustrated in FIG. 5 is used. As illustrated in FIG. 6, there are four types of inter-mode crosstalk that are noise components. The output of a higher-order component to a Port 1 can be removed by disposing a mode filter in which a waveguide is narrowed to satisfy a single mode condition, so that crosstalk to the Port 2 is considered.

Assuming that the output from a Port 3 (zeroth order) to the Port 1 (zeroth order) is P1, the output from the Port 3 (zeroth order) to the Port 2 (zeroth order) is P2, and the output from the Port 3 (LP11b) to the Port 2 (zeroth order) is P3, then (P2+P3)/P1 is defined as the inter-mode crosstalk $XT_{mode}$.

With reference to FIG. 7, a mode coupler according to a first embodiment of the present disclosure will be described. A mode coupler 70 illustrated in FIG. 7 is an asymmetric directional coupler including two waveguides 71 and 72. It is assumed that one end of the thicker waveguide 71 is the Port 1 and the other end is the Port 3. It is assumed that one end of the thinner waveguide 72 is the Port 2 and the other end is a Port 4. A waveguide 73 is disposed between the waveguide 71 and the waveguide 72 as a mode conversion unit so as to be adjacent to each other. In the mode coupler 70, a mode filter 74 is disposed on the Port 1 side of the waveguide 71 relative to the position adjacent to the waveguide 73. The mode filter 74 is formed as a tapered waveguide such that the width of the waveguide 71 is narrowed to satisfy a single mode condition. The mode filter 74 removes higher-order components toward the Port 1 so that only light in the zeroth-order mode is guided and output from the Port 1. The mode coupler 70 may be achieved by using a quartz-based planar lightwave circuit (PLC). In FIG. 7, $W_0$ indicates the waveguide width of the thinner waveguide 72, $W_1$ indicates the waveguide width of the thicker waveguide 71, and $W_2$ indicates the waveguide width of the waveguide 73.

Figure 1:
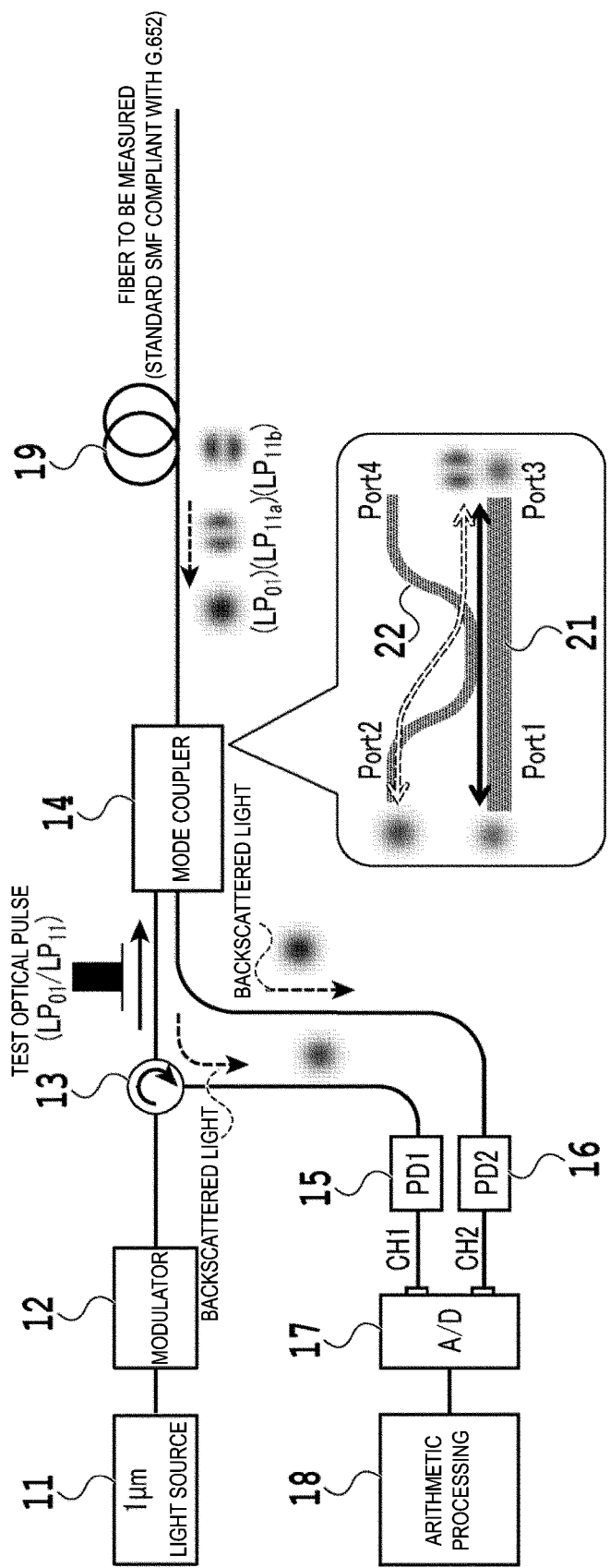
FIG. 1 is a diagram illustrating a method of monitoring a laid fiber using a higher-order mode.
Figure 2:
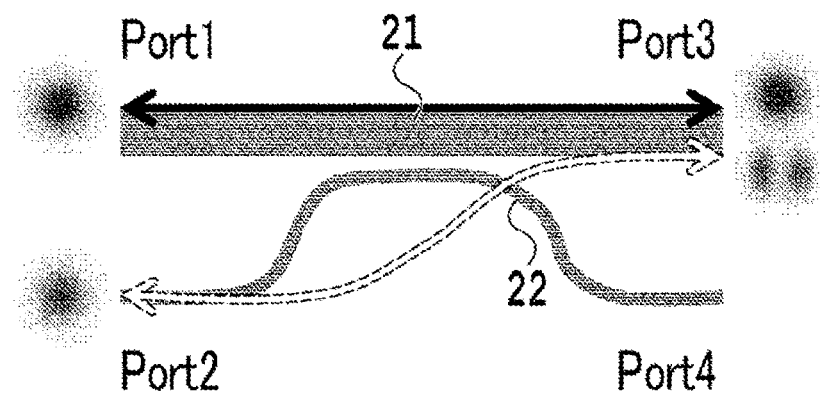
FIG. 2 is a diagram illustrating a mode coupler in the related art.
Figure 3:
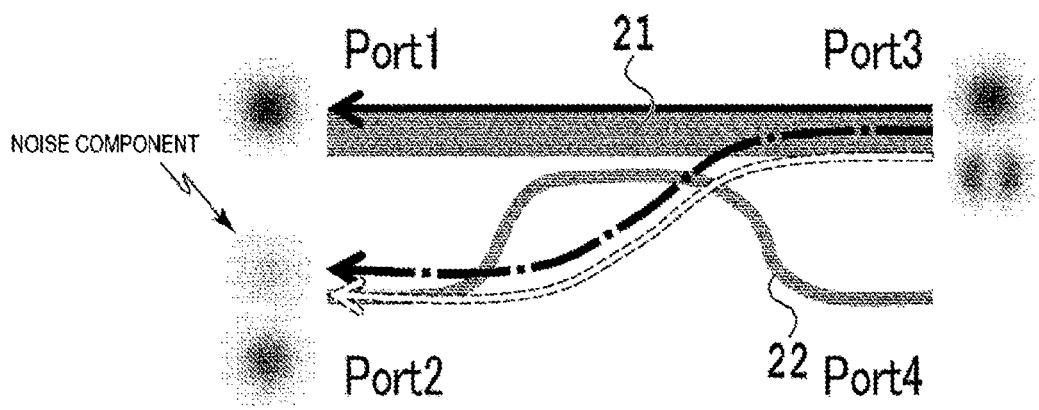
FIG. 3 is a diagram illustrating a state in which light input from a Port 3 is multiplexed and demultiplexed to a Port 1 and a Port 2, in the mode coupler in the related art of FIG. 2.
Figure 4:
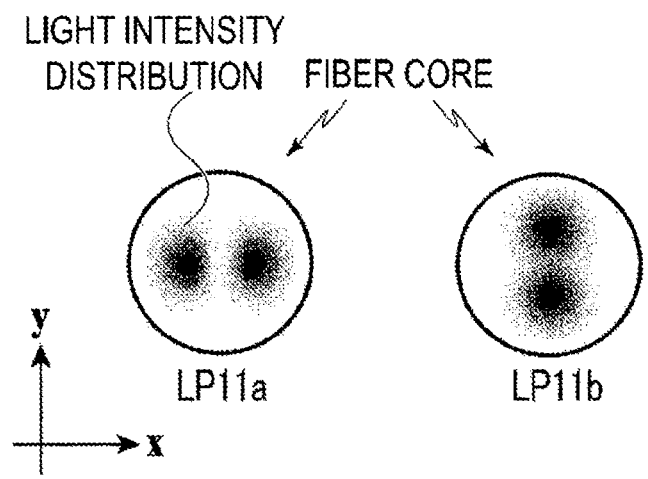
FIG. 4 is a diagram illustrating a distribution of a first-order mode propagating through a fiber.

As described above with reference to FIG. 1, in the related art, the mode coupler 14 has converted the pulse signal input to the Port 2 from the zeroth-order mode to the desired higher-order mode, and output the signal from the Port 3. In this conversion, there are no higher-order modes other than the zeroth order mode and desired higher-order mode. That is, in the related art, the mode coupler 14 has directly converted a pulse signal from the zeroth-order mode to the desired higher-order mode.

In the present embodiment, conversion to a mode different from the zeroth-order mode and the desired higher-order mode is once performed for conversion between the zeroth-order mode and the desired higher-order mode, thereby enhancing the isolations between the modes. More specifically, in the mode coupler 70 of the present embodiment, the waveguide 73 is disposed between the waveguide 71 and the waveguide 72, so that conversion to a higher-order mode different from the zeroth-order mode and the desired higher-order mode is once performed for conversion between the zeroth-order mode and the desired higher-order mode.

As an example, a case is considered in which the core thickness of the waveguide is 5.6 µm, the refractive index difference ∆ between the core and the cladding is 0.42%, the mode conversion is performed between the zeroth order and the second order and between the second order and the first order, and the operating wavelength is 1050 nm.

Figure 8:
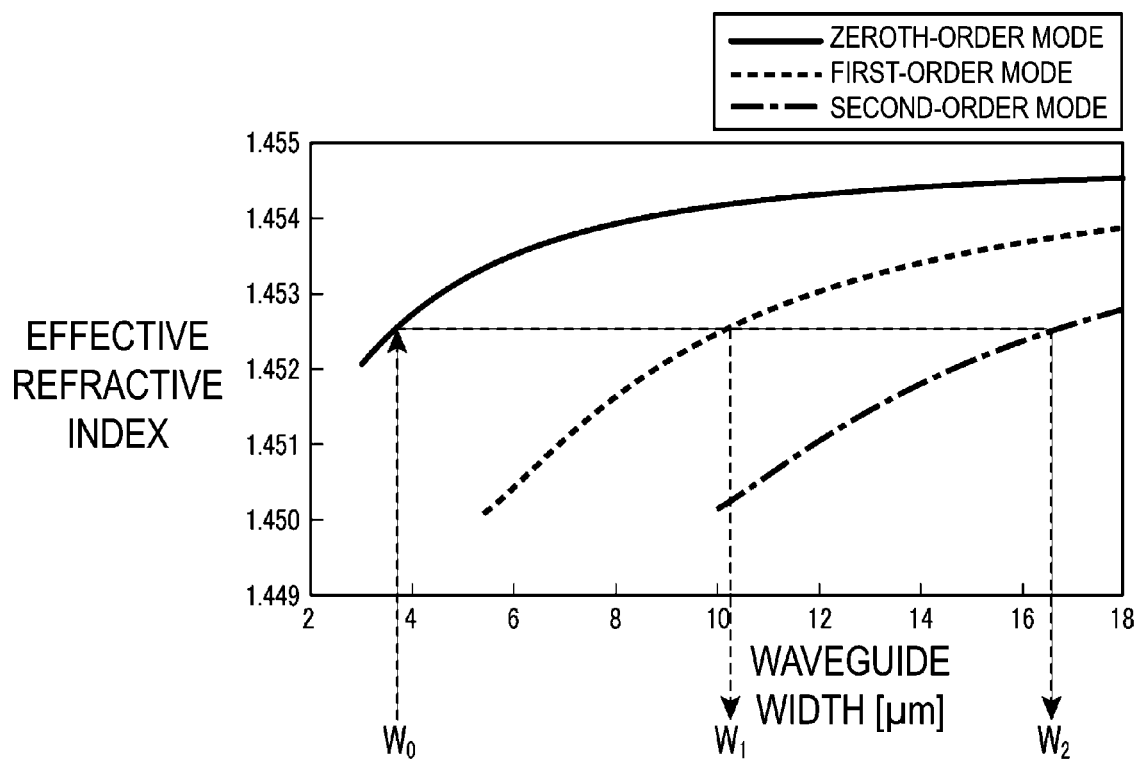
FIG. 8 is a diagram illustrating a relationship between a waveguide width and an effective refractive index.

FIG. 8 is a diagram illustrating the relationship between the waveguide width and the effective refractive index. To fully convert modes, the effective refractive indexes of respective modes need to be matched. For example, in a case where $W_0$ is 3.5 µm, it is determined that $W_1$ is 10.1 µm and that $W_2$ is 16.4 µm. First, propagation in a forward direction (from the Port 2 to the Port 3) is considered.

Figure 9:
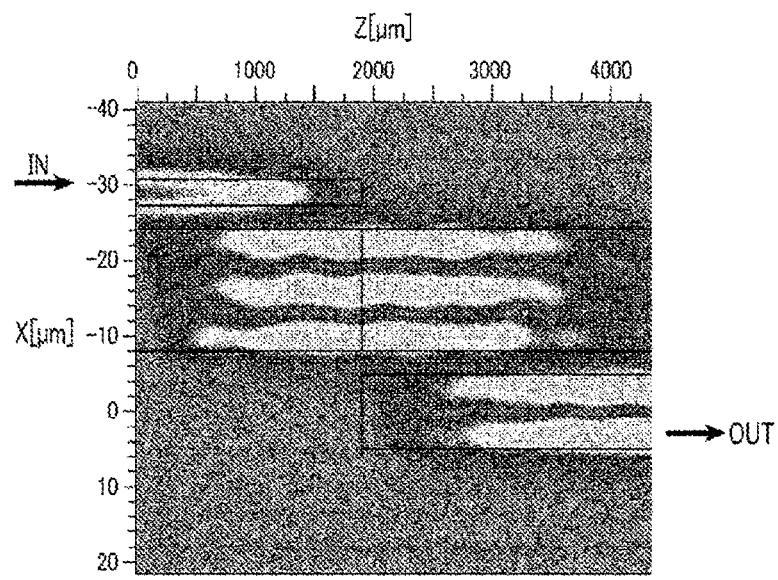
FIG. 9 is a diagram illustrating a state of propagation of light in the mode coupler of FIG. 7.

FIG. 9 is a diagram illustrating a state of propagation of light in a case where the mode coupler 70 of FIG. 7 is configured by using the numerical examples described above. It can be seen that in the mode coupler 70, the light input to the Port 2 is converted from the zeroth order to the second order, then converted from the second order to the first order, and output to the Port 3.

Figure 10:
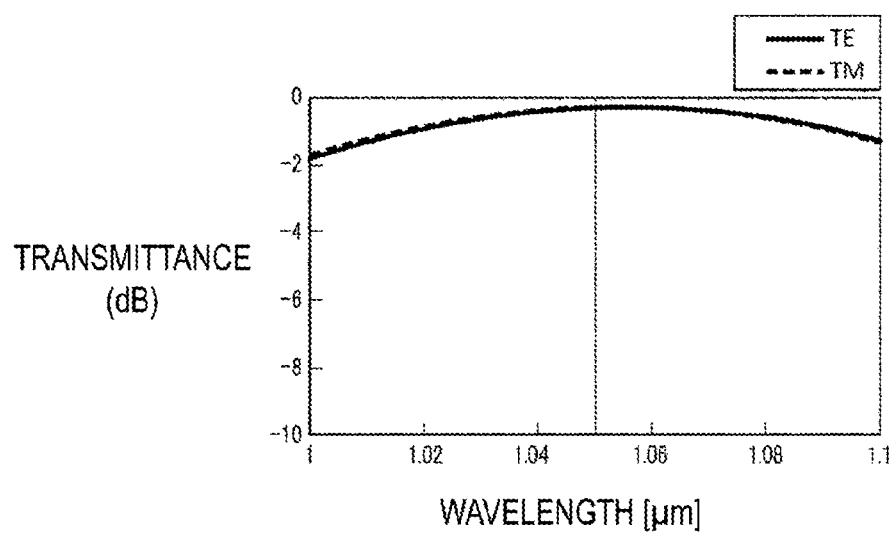
FIG. 10 is a diagram illustrating a transmittance of the mode coupler from a Port 2 to a Port 3 in FIG. 7.

FIG. 10 is a diagram illustrating transmittance from the Port 2 to the Port 3. A three-dimensional beam propagation method (BPM) is used for calculation. It can be seen that a transmittance of about 100% is obtained at operating wavelength of 1050 nm.

Next, propagation in the reverse direction (from the Port 3 to the Port 2) is considered. The output P2 (output from the Port 3 (zeroth order) to the Port 2 (zeroth order)) and the output P3 (output from the Port 3 (LP11b) to the Port 2 (zeroth order)) when LP11b of the zeroth-order mode of 0 dB is input from the Port 3 as the backscattered light are −49.0 dB and −51.1 dB respectively (simulation values). In the case of a direct conversion-type mode coupler in the related art, P2 and P3 are −31.8 dB and −36.3 dB respectively, so that the mode coupler of the present embodiment can reduce the inter-mode crosstalk $XT_{mode}$ by about 20 dB.

As described above, according to the present embodiment, a mode coupler with low inter-mode crosstalk can be obtained. In the present embodiment, the mode coupler 70 is configured to convert light input to the Port 2 from the zeroth order to the second order, and then convert the light from the second order to the first order. However, it goes without saying that the number of conversions and the order number of an intermediate mode are not limited in the present disclosure.

REFERENCE SIGNS LIST

11 Light source
12 Converter
13 Optical circulator
14 Mode coupler
15, 16 Photodiode
17 A/D converter
18 Arithmetic processing device
19 Laid fiber
21,22 Waveguide
70 Mode coupler
71,72,73 Waveguide
74 Mode filter

The invention claimed is:

1. A mode multiplexing/demultiplexing optical circuit including a first waveguide and a second waveguide formed on a planar light wave circuit, the mode multiplexing/demultiplexing optical circuit comprising:
   a first input/output port configured to allow light from a light source to be input to the first waveguide;
   a second input/output port configured to allow the light propagating through the first waveguide to be output;
   a mode conversion unit located adjacent to the first waveguide, and configured to convert a mode of light input from the second input/output port to a mode of a higher order than an order of the mode when the light is input to the second input/output port; and
   a third output port configured to convert, via the second waveguide located adjacent to the mode conversion unit, a mode of light input to the mode conversion unit to a mode of a lower order than the order of the mode when the light is input to the second input/output port, and output the converted light,
   wherein the first waveguide, the mode conversion unit, and the second waveguide are adjacent to each other in this order, and widths of the waveguides at adjacent locations satisfy a relationship: a width of the mode conversion unit>a width of the first waveguide>a width of the second waveguide.

2. The mode multiplexing/demultiplexing optical circuit according to claim 1, wherein
   the light input from the light source to the first input/output port is in a zeroth-order mode, and
   the light input from the second input/output port is in a first-order mode when the light is input to the second input/output port, is converted to a second-order mode in the mode conversion unit, is converted to a zeroth-order mode in the second waveguide, and is output from the third output port.

3. The mode multiplexing/demultiplexing optical circuit according to claim 1, further comprising:
   a mode filter located on a side of the first input/output port in the first waveguide relative to a position adjacent to the mode conversion unit, wherein the mode filter has a structure in which a width of the first waveguide is narrowed toward the first input/output port.

\* \* \* \* \*